(12) United States Patent
Mizutani et al.

(10) Patent No.: US 7,734,165 B2
(45) Date of Patent: Jun. 8, 2010

(54) IMAGING APPARATUS

(75) Inventors: Naoki Mizutani, Nagano (JP);
Kunihiko Kanai, Nagano (JP); Yuji Shibata, Nagano (JP); Masao Harada, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 428 days.

(21) Appl. No.: 11/689,718

(22) Filed: Mar. 22, 2007

(65) Prior Publication Data
US 2008/0050108 A1 Feb. 28, 2008

(30) Foreign Application Priority Data
Aug. 25, 2006 (JP) .............................. 2006-229413

(51) Int. Cl.
G03B 3/00 (2006.01)
G03B 13/20 (2006.01)
(52) U.S. Cl. ....................................... 396/104; 396/139
(58) Field of Classification Search ................... 396/51, 396/72, 77, 104, 139; 348/78, 345
See application file for complete search history.

(56) References Cited

U.S. PATENT DOCUMENTS
2007/0201851 A1* 8/2007 Misawa et al. .............. 396/125
2008/0037975 A1* 2/2008 Nakajima ................... 396/104

FOREIGN PATENT DOCUMENTS
JP 2003-075717 3/2003
JP 2006-018246 1/2006

* cited by examiner

Primary Examiner—Rodney E Fuller
(74) Attorney, Agent, or Firm—Thomas J. Strouse; Peyton C. Watkins

(57) ABSTRACT

When focus adjustment operation is performed, a first measured distance acquired by utilization of TTL-AF and a second measured value acquired by utilization of a distance between the eyes have been computed in advance. The degree of reliability of the first measured distance is compared the degree of reliability of the second measured distance in accordance with a result of a determination as to whether or not a face is detected, a result of a determination as to whether or not an ambient brightness value Br is equal to or less than a reference value, a result of a determination as to whether or not a focal length "f" is equal to or less than a reference value, and a result of a determination as to whether or not a second measured distance De is less than a first measured distance Dt.

11 Claims, 12 Drawing Sheets

IMAGING APPARATUS

CROSS REFERENCE TO RELATED APPLICATIONS

This application claims priority to Japanese Patent Application No. 2006-229413 filed on Aug. 25, 2006, which is incorporated herein by reference in its entirety.

FIELD OF THE INVENTION

The present invention relates to an imaging apparatus which adjusts a focus by means of adjusting the position of a group of focus adjustment system lenses included in an imaging optical system.

BACKGROUND OF THE INVENTION

Many pieces of imaging apparatus currently on the market have an autofocus (hereinafter abbreviated as "AF") for automatically adjusting a focus. A technique called TTL-AF (through-the-lens AF) is heavily used for this AF function at the present time. TTL-AF is a technique utilizing the fact that the edge of an image of the subject becomes clear at a focused focal point. Specifically, according to this technique, a specific frequency component of a predetermined area in a captured image (a preview image) is extracted, and an evaluation value which is an index showing the intensity of a contrast is determined from the thus extracted frequency component. The focus adjustment system lens is moved back and forth in such a way that the evaluation value fulfills a predetermined condition; e.g., the acquisition of the maximum value, thereby performing focusing operation.

However, the TTL-AF has a problem of being likely to focus on an object (or an area) exhibiting high contrast. For instance, under the situation called a night-view portrait in which the image of a person located at a comparatively-close position is captured while a night view is taken as a background, the night view serving as a background is likely to exhibit higher contrast than does the person that is the principal subject. In this case, the previously-described evaluation value is likely to become higher by bringing the night view into focus rather than bringing the person into focus. For this reason, there arises a problem of the night view remaining in focus; i.e., the imaging apparatus being likely to enter a so-called "rear-focused" state.

An AF technique utilizing information about a captured face has recently been put forward as AF means other than the TTL-AF technique. For instance, Japanese Patent Laid-Open Publication 2003-75717 describes a technique of: extracting the face of a person from a captured image (a preview image); estimating a distance to a subject from the size of the face; and performing focus adjustment operation. Japanese Patent Laid-Open Publication 2006-18246 describes a technique of: extracting a face of a person from a captured image (a preview image) or a distance between the eyes of the person; essentially estimating a distance to the subject from the size of the person or the distance between the eyes; and effecting TTL-AF in the vicinity of the thus-essentially-estimated distance to the subject. As mentioned above, attainment of a focus on an area other than the principal subject is prevented to a certain extent by utilization of information about the face of the person that is the principal subject for AF.

However, because suitable and unsuitable conditions are present for TTL-AF, suitable and unsuitable conditions exist for AF utilizing face information, as well. Consequently, as described in the Laid-Open Publications, there arises a case where an accurate focus adjustment operation cannot be performed under certain image-capturing conditions even when AF utilizing face information is adopted.

SUMMARY OF THE INVENTION

Accordingly, the present invention provides an imaging apparatus which selects AF suitable for an image-capturing situation and, by extension, can enhance the accuracy of focus adjustment operation.

The present invention provides an imaging apparatus which performs focus adjustment operation by means of adjusting the position of a group of focus adjustment system lenses included in an imaging optical system, the apparatus comprising:

an imaging unit for subjecting an image of a subject condensed by the imaging optical system to photoelectric conversion, to thus acquire a captured image;

a first distance measurement unit for acquiring, as a first measured distance, a distance from the imaging optical system to the subject, in accordance with a result of detection of contrast of a predetermined distance measurement target area in the captured image;

a face detection unit for detecting from the captured image coordinate positions, on the captured image, of at least the eyes of a person appearing in the captured image;

an eye-to-eye distance computing unit for computing a distance between the eyes in a captured image of at least one person appearing in the captured image, in accordance with the detected coordinate positions of the eyes;

a second distance measurement unit for computing a distance from an image-capturing optical system to a subject from the computed distance between the eyes and acquiring the distance as a second measured distance;

a reliability estimation unit for estimating a degree of reliability of the first measured distance and a degree of reliability of the second measured distance; and a focus adjustment unit for performing focus adjustment operation in accordance with a measured distance determined to be highly reliable by the reliability estimation unit.

In a preferred mode, the reliability estimation unit determines the reliability of the first measured distance and that of the second measured distance in accordance with at least a result of comparison between the first measured distance and the second measured distance. In another preferred mode, the reliability estimation unit determines the reliability of the measured distances in accordance with at least a focal length. Moreover, the reliability estimation unit determines the reliability of the measured distances in accordance with at least a result of a determination as to whether or not the second measured distance falls within a measurable range of the second distance measurement unit. Further, the reliability estimation unit determines the reliability of both measured distances in accordance with at least ambient brightness.

In another preferred mode, the face detection unit further detects, as a face area, an area occupied by a face of a person appearing in the captured image; and the first distance measurement unit takes an area around the face area detected by the face detection unit as a distance measurement target area.

In yet another preferred mode, the first distance measurement unit divides an area in a predetermined range, including the face area extracted by the face detection unit, into a plurality of distance measurement target areas, and acquires measured distances of the respective distance measurement target areas as first measured distances; the reliability estimation unit determines a distance measured by the first distance measurement unit to be more reliable than a distance measured by the second distance measurement unit when a difference among the respective first measured values computed by the first measurement unit is equal to or lower than a predetermined value; and the focus adjustment unit selects any one from the plurality of first measured distances and performs focus adjustment operation in accordance with the thus-selected distance when the distance measured by the first distance measurement unit is determined to be highly reliable. In this case, at least one of the plurality of distance measurement target areas is preferably included in the face area of the subject. Further, the focus adjustment unit preferably selects the shortest measured distance from the plurality of first measured distances. Alternatively, the focus adjustment unit selects a measured distance acquired from a distance measurement target area having the highest contrast value among the plurality of first measured distances.

Another invention provides an imaging apparatus which performs focus adjustment operation by means of adjusting the position of a group of focus adjustment system lenses included in an imaging optical system, the apparatus comprising:

an imaging unit for subjecting an image of a subject condensed by the imaging optical system to photoelectric conversion, to thus acquire a captured image;

a first distance measurement unit for acquiring, as a first measured distance, a distance from the imaging optical system to the subject, in accordance with a result of detection of contrast of a predetermined distance measurement target area in the captured image;

a face detection unit for detecting, from the captured image, at least a characteristic of a person appearing in the captured image;

a second distance measurement unit for computing a distance from an image-capturing optical system to a subject from characteristics of the detected face and acquiring the distance as a second measured distance;

a reliability estimation unit for estimating a degree of reliability of the first measured distance with a degree of reliability of the second measured distance; and a focus adjustment unit for performing focus adjustment operation in accordance with a measured distance determined to be highly reliable by the reliability estimation unit.

According to the present invention, the degree of reliability of the first measured distance and the degree of reliability of the second measured distance are compared with each other. Focus adjustment operation is performed in accordance with the measured distance determined to be highly reliable. Consequently, the accuracy of focus adjustment operation can be further enhanced.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Figure 1:
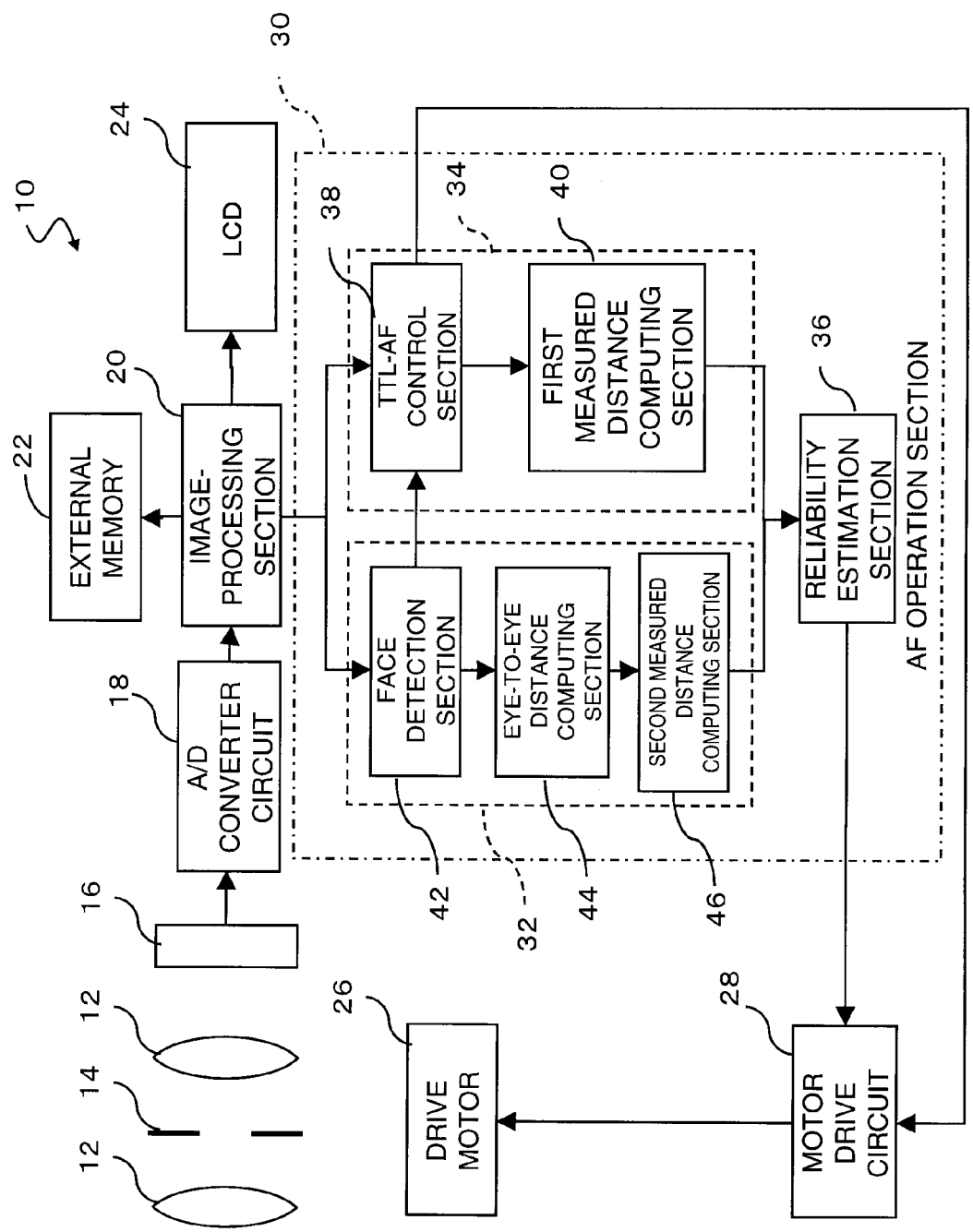
FIG. 1 is a block diagram showing the general configuration of a digital camera corresponding to an embodiment of the present invention.

Embodiments of the present invention will be described hereinbelow by reference to the drawings. FIG. 1 is a block diagram showing the general configuration of a digital camera 10 corresponding to an embodiment of the present embodiment.

Luminous flux of a subject condensed by a group of lenses 12 and an aperture member 14 is subjected to photoelectric conversion performed by a CCD 16 serving as an imaging element, and the thus-converted flux is converted into a digital signal by an analog-to-digital converter circuit 18. A digital signal output from the analog-to-digital converter circuit 18 is input to an image-processing section 20. The image-processing section 20 subjects the input digital signal to predetermined image processing; e.g., pixel addition processing, color correction processing, and distortion correction processing, and the like; and outputs the processed signal as image data. Specifics of image processing are changed, as required, in accordance with the application of output image data. Specifically, the application of image data includes a case where image data are utilized as a record image which is acquired pursuant to a user's image-capture command and recorded in external memory 22 and where image data are utilized as a preview image displayed on an LCD 24 serving as an electronic finder. In a case where image data are utilized as a record image, the image data are subjected chiefly to signal processing which enables further enhancement of image quality of the image data. Meanwhile, when image data are utilized as a preview image, special emphasis is placed on a decrease in rates of various processing operations which will be performed later. Consequently, when image data are utilized as a preview image, the data are subjected to processing which enables a certain degree of reduction in the volume of image data; i.e., pixel skipping.

The image data output from the image processing section 20 are, in accordance with the application thereof, stored in the external memory 22 or displayed on the LCD 24. Of the image data, preview image data are input to an AF operation section 30 where the data are utilized for AF operation.

The AF operation section 30 is roughly divided into a TTL-AF section 34, an eye-to-eye distance AF section 32, and a reliability estimation section 36. The TTL-AF section 34 computes a distance to the subject as a first measured distance Dt by utilization of a known TTL-AF technique. The TTL-AF section 34 comprises a TTL-AF control section 38 and a first distance measurement value computing section 40. The TTL-AF control section 38 has the same configuration as that of known TTL-AF means. Specifically, the TTL-AF control section 38 computes an AF evaluation value while moving a focus adjustment system lens when focus adjustment operation is required. The AF evaluation value represents the degree of sharpness of an edge in an area previously set as a distance measurement area in the preview image. The AF evaluation value is determined by means of extracting a specific frequency component from, e.g., a distance measurement area.

The TTL-AF control section 38 specifies a lens position where a peak value of the AF evaluation value comes to a predetermined reference value Thp or more as a lens position where a subject is focused; namely, a focused lens position. When a peak, where a peak value comes to the reference value Thp or more, has appeared in a plurality of locations a lens position where a distance to a subject becomes the shortest among the plurality of peak positions is specified as a focused lens position. When a peak of predetermined reference value Thp or more has not appeared at any of the lens positions, TTL-AF is determined to be a failure.

From the lens position specified as a focused lens position by the TTL-AF control section 38, a first distance measurement value computing section 40 computes a distance from the lens to the subject as a first measured distance Dt.

The eye-to-eye distance AF section computes, from a distance between the eyes of a person appearing in a preview image; namely, the distance between the eyes, the distance from the lens to the subject as a second measured distance De. The eye-to-eye distance AF section 32 comprises a face detection section 42, an eye-to-eye distance computing section 44, and a second distance measurement value computing section 46. The face detection section 42 detects a face area of the face of the person appearing in a preview image output from the image-processing section 20 and positions of respective parts (e.g., eyes and the like) constituting the face. A known related-art technique can be used for detecting the face. For instance, as described in Japanese Patent Laid-Open Publication No. 2006-18246, the position of the face area or the positions of the respective parts may be specified by use of an image recognition technique such as a pattern recognition technique and the like.

When a person is included in a preview image and when the position of a face area and positions of respective parts have been detected, the face detection section 42 outputs information about coordinates of the face area to the TTL-AF control section 38 and information about coordinates of the eyes to the eye-to-eye distance computing section 44. The TTL-AF control section 38 performs TTL-AF while taking the face area as a distance measurement area. From the thus-obtained information about coordinates of the eyes, the eye-to-eye distance computing section 44 computes a distance between eyes (more accurately the number of pixels existing between the eyes) in the preview image.

From the distance between the eyes (the number of pixels existing between the eyes) computed by the eye-to-eye distance computing section 44, the second distance measurement value computing section 46 computes the distance from the lens to the subject as the second measured distance De. A method for computing the second measured distance De will be briefly described by reference to FIG. 2.

Figure 2:
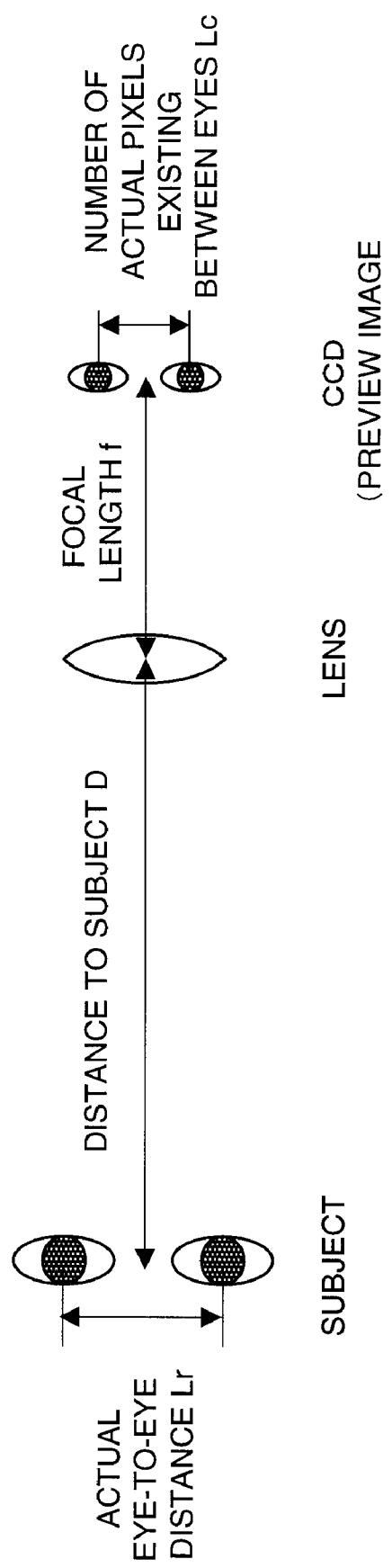
FIG. 2 is a view showing the principle of measurement of a distance on the basis of a distance between eyes.

FIG. 2 is a conceptual rendering showing a relationship between an eye-to-eye distance Lr (cm) of an actual subject and the number of pixels Lc (pix) existing between the eyes appearing in a preview image. The distance between eyes of an adult is usually known as being essentially constant regardless of the size of a face, race, gender, and the like. In the present embodiment, the distance from a lens to a subject (a subject distance D) is computed by utilization of this known fact. Specifically, the subject distance D is determined according to Equation 1. In Equation 1, reference symbol "f" denotes a focal length, and Pc denotes a pitch width of a CCD.

$$D=(Lr \times f)/(Lc \times Pc) \qquad \text{Eq. 1}$$

Turning again to FIG. 1, the configuration of the digital camera 10 will be described. The reliability estimation section 36 estimates the degree of reliability of the first measured distance Dt acquired by utilization of TTL-AF with the degree of reliability of the second measured distance De acquired by utilization of the eye-to-eye distance, and determines the measured distance having a higher degree of reliability. A motor drive circuit 28 is commanded to perform focus adjustment operation in accordance with the measured distance determined to have a higher degree of reliability. Specifically, the reliability estimation section 36 computes the position of the focus adjustment system lens in accordance with the measured distance having a higher degree of reliability, and commands the motor drive circuit 28 to move the lens to the thus-computed position. The motor drive circuit 28 having received this command moves a motor 26 so as to move the lens to the specified position. As a result, the focus adjustment operation is realized. Lc×Pc in Equation 1 may also be previously computed by the eye-to-eye distance computing section 44.

In the present embodiment, in addition to computation of the first measured distance Dt acquired by utilization of TTL-AF, the second measured distance De acquired by utilization of the eye-to-eye distance is computed. The reason for is this that TTL-AF usually enables highly-accurate measurement of a distance in a situation of high brightness and, by extension, focus adjustment. However, in a situation of low ambient brightness, there arises a problem of an object which is higher in contrast than a principal subject (e.g., a person or the like) being more likely to be focused.

Figure 3:
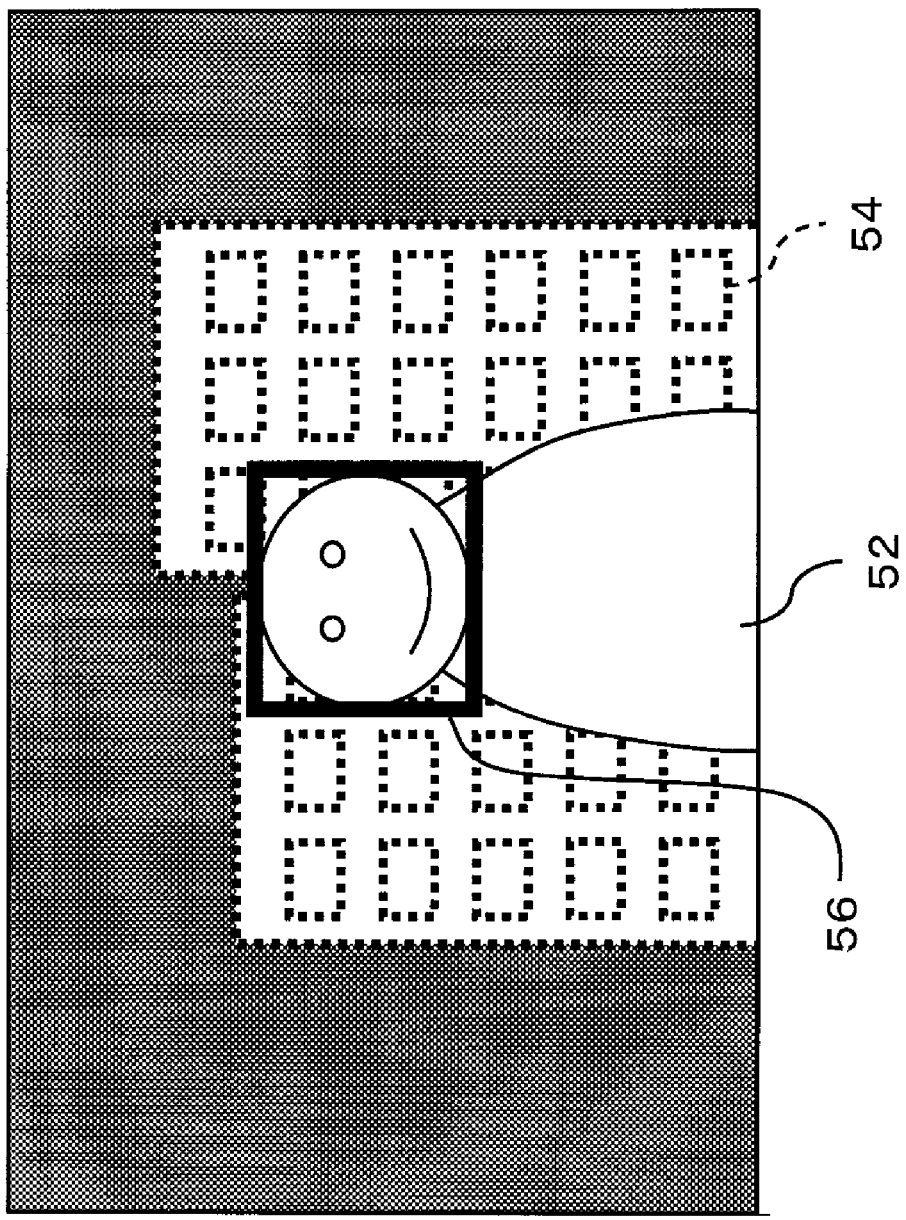
FIG. 3 is a view showing a way to capture an image of a person while a night view is taken as a background.

For instance, as shown in FIG. 3, consideration is given to a case where the image of a person 52 is captured while a night view 54; e.g., a group of buildings where light is coming out of windows, is taken as a background. In this case, ambient brightness is of low level, and hence the person 52 that is the principal subject is comparatively dark and exhibits low contrast. In contrast, the night view 54 serving as a background exhibits high contrast with clear effects of light and shade.

Figure 4:
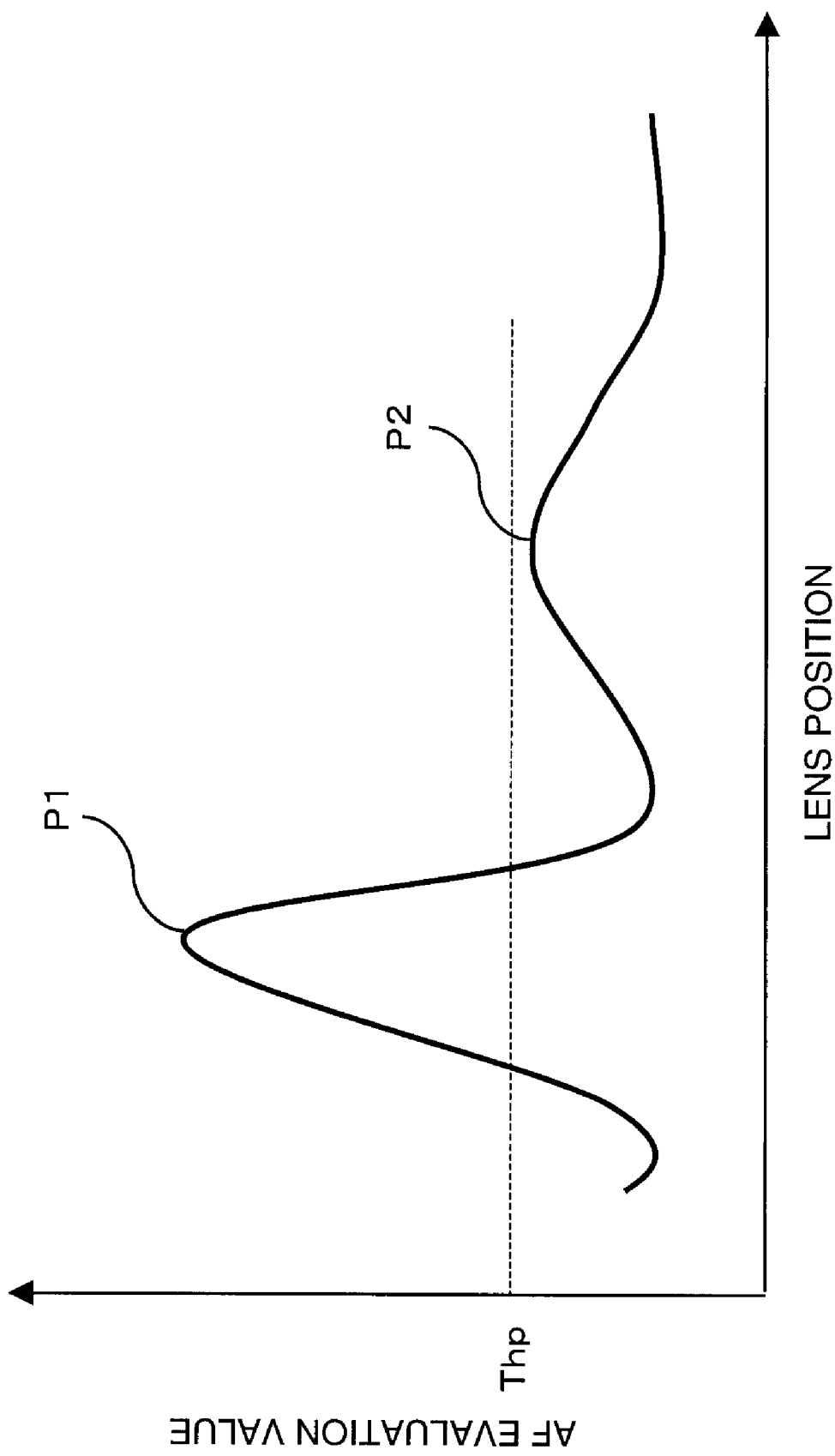
FIG. 4 is a view showing an example AF evaluation value.

FIG. 4 shows an AF evaluation value computed under such a situation while an area (a rectangular area indicated by a thick line in FIG. 3) around the person 52 is taken as a distance measurement area 56. In FIG. 4, the horizontal axis shows the position of the lens, and the vertical axis shows an AF evaluation value. In the present embodiment, the smaller the lens position, the greater the focused subject distance.

An AF evaluation value pertaining to a composition where the night view 54 and the person 52 are mixedly present assumes a high peak P1 when the night view 54 serving as a background is focused on and a low peak P2 when the person 52 serving as the principal subject is focused on. The reason for this is that contrast becomes clear and that the edge of the entirety becomes sharp when the night view 54 having high contrast is focused on. Meanwhile, since the person 52 is entirely dark, the edge of the person is less likely to appear clearly even when the person 52 is focused on, and hence a low peak appears in the AF evaluation value.

When a plurality of peaks have appeared in the AF evaluation value, the TTL-AF control section 38 specifies, as a focused lens position, a lens position where a distance to a subject becomes shortest; in other words, a lens position where the value of the lens position becomes maximum, among the plurality of peak positions. The reason for this is that the principal subject is often located at the most proximal position. However, the TTL-AF control section 38 eliminates a peak of predetermined AF reference value Thp or less from the plurality of peaks. This is a requirement indispensable for eliminating the influence of noise or the like.

Figure 5:
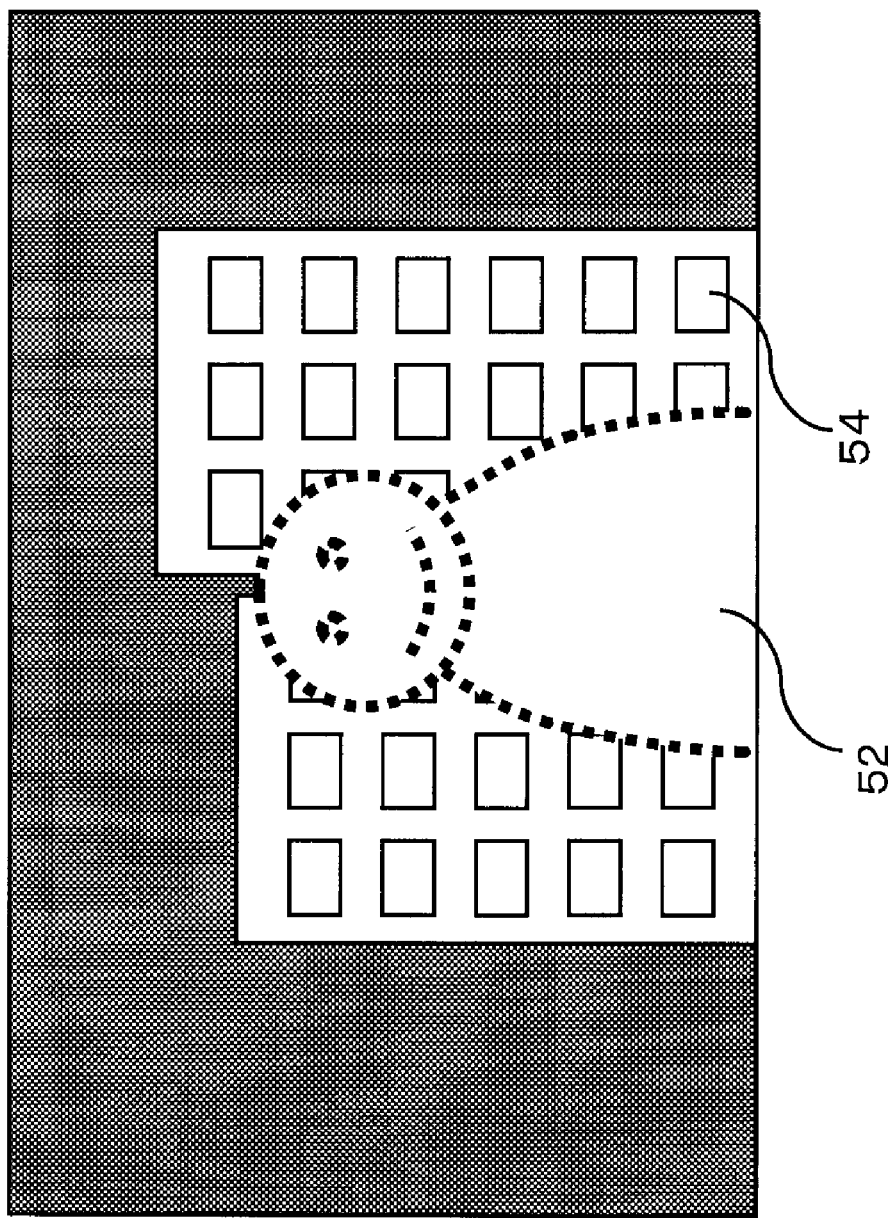
FIG. 5 is a view showing an example rear-focused state.

However, in many cases, the face of the person 52 appearing against the night view 54 that is the background is captured comparatively darkly, and there also arises a case where the AF evaluation value achieved when the person 52 is focused falls below the AF reference value Thp. In this case, the TTL-AF control section 38 ignores the peak P2 achieved when the person 52 is focused on, and specifies a focused lens position in accordance with another peak P2. Consequently, as shown in FIG. 5, there sometimes arises a case where the night view 54 serving as a background is brought into focus rather than the person 52; namely, a case where a "rearward focus" is achieved.

As mentioned above, TTL-AF often enters a situation where difficulty is encountered in performing suitable focus adjustment operation. Accordingly, in the present embodiment, measurement of a distance utilizing a distance between the eyes and, by extension, focus adjustment are performed. However, as there are situations suitable and unsuitable for TTL-AF, there are situations suitable and unsuitable for AF utilizing a distance between the eyes.

Accordingly, in the present embodiment, the degree of reliability of the first measured distance Dt and the degree of reliability of the second measured distance De are estimated with each other. Focus adjustment operation is performed on the basis of the measured distance determined to have a higher degree of reliability. The flow of a estimation the degrees of reliability of the measured distances will be described by reference to FIG. 6.

Figure 6:
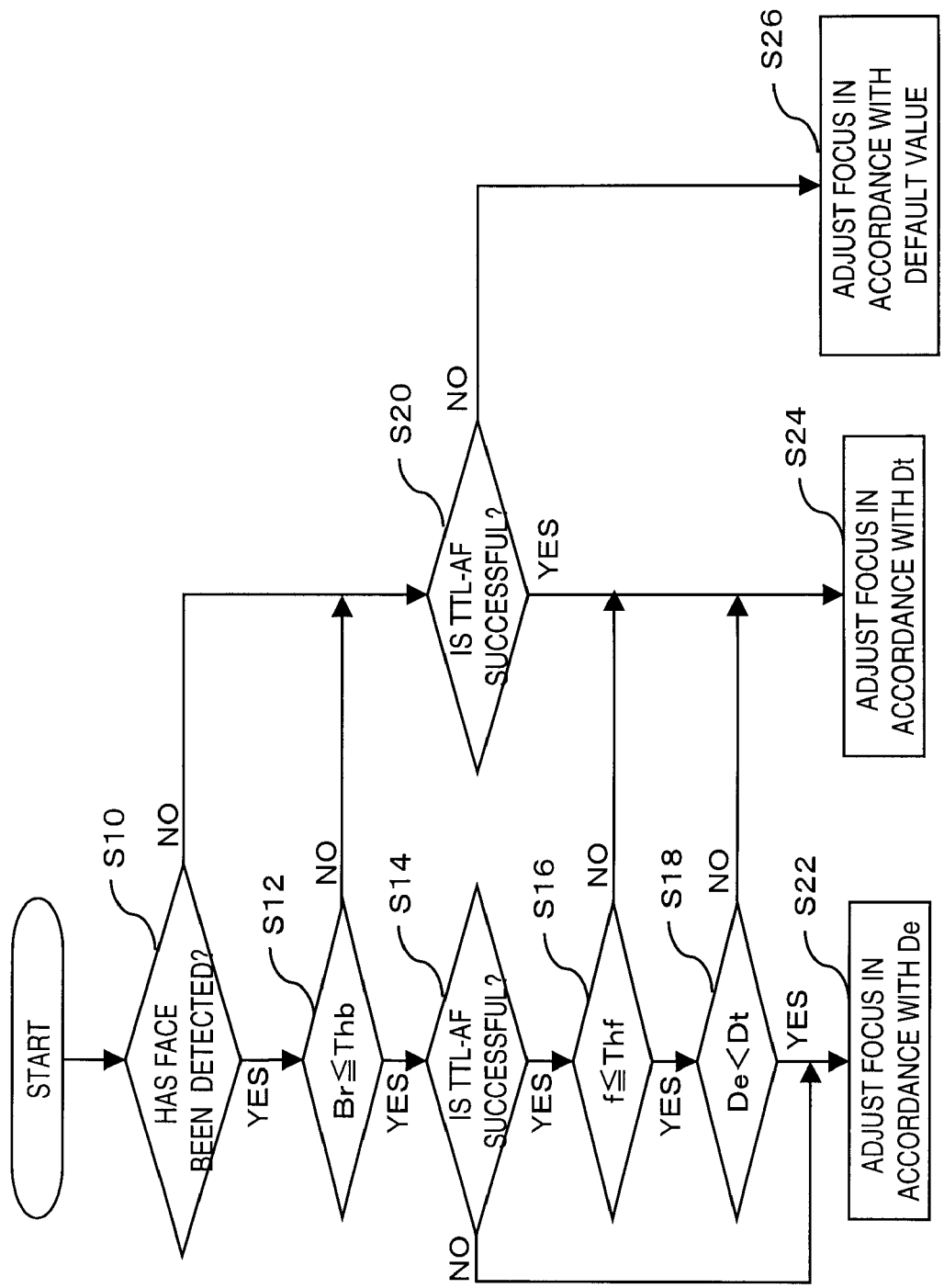
FIG. 6 is a flowchart showing the flow of a estimation the degrees of reliability of measured distances.

FIG. 6 is a flowchart showing the flow of a estimation the degree of reliability of the first measured distance and the degree of reliability of the second measured distance. The reliability estimation section 36 first determines whether or not the face detection section 42 has detected a face section; in other words, whether or not a preview image includes a person's face (S10).

When the face area has not been detected, implementation of AF operation utilizing a distance between the eyes is impossible. Therefore, when the face area is not detected, a determination is made as to whether or not TTL-AF is available (S20). Specifically, a determination is made as to whether TTL-AF is successful or unsuccessful. As mentioned previously, the failure of TTL-AF means a case where a peak of AF evaluation value of predetermined AF reference value Thp or more has not appeared at any of the lens positions. Since the face area has not been detected (when NO is selected in step S10) in S20, the distance-measurement area of TTL-AF corresponds to an area around the center of the preview image or an area designated by the user.

When TTL-AF is determined to be successful, the degree of reliability of the first measured distance Dt computed by utilization of TTL-AF is determined to be higher, and focus adjustment operation is performed in accordance with the first measured distance Dt (S24).

When TTL-AF is determined to have ended in failure, focus adjustment operation is performed while a previously-set default value is taken as a distance to a subject (S26). Although the default value is not highly accurate, the default value is set in advance on the prediction that focus adjustment operation can be performed while a certain degree of accuracy is maintained.

Turning again to step S10, there will be described a flow of operation performed when the face area is detected. When the face area has been detected, a determination is subsequently made as to whether or not ambient brightness Br is equal to or more the predetermined brightness reference value Thb (S12). Ambient brightness Br may also be computed from a brightness value, or the like, of pixels forming the preview image. Alternatively, the digital camera 10 may have been provided with a photometric sensor, and the ambient brightness Br may be acquired from the photometric sensor. Moreover, the brightness reference value Thb is a brightness value which poses difficulty in implementing high-precision TTL-AF. Specifically, the brightness reference value Thb is set to a brightness value at which the AF evaluation value acquired when the person is brought into focus becomes less than the AF reference value Thp.

When the ambient brightness Br is greater than the brightness reference value Thb, implementation of highly-accurate TTL-AF is possible. Consequently, when the ambient brightness Br is greater than the brightness reference value Thb, the degree of reliability of the first measured distance Dt acquired by utilization of TTL-AF is also determined to be high, and processing proceeds to step S20. When TTL-AF has achieved success, focus adjust operation is performed on the basis of the first measured distance Dt. When TTL-AF has failed, focus adjustment operation is performed in accordance with a default value (S24, S26).

Meanwhile, when the ambient brightness Br is equal to or less than the brightness reference value Thb; namely, when the entire preview image is dark and the contrast of the person's face is low, the reliability of the first measured distance Dt can be said to be somewhat low. Consequently, in this case, the reliability of the first measured distance Dt and the reliability of the second measured distance De are estimated with each other in a more detailed manner in consideration of another requirement. Specifically, when the ambient brightness Br is equal to or less than the brightness reference value Thb, a determination is made as to whether TTL-AF is successful or unsuccessful (S14). Since in step S14 the face area has already been detected (Yes has been selected in step S10), the distance-measurement area of TTL-AF corresponds to the face area.

When in step S14 TTL-AF is determined to have failed, the focus adjustment operation is performed in accordance with the second measured distance acquired by utilization of the eye-to-eye distance (S22). In contrast, when TTL-AF is determined to have been successful, another determination is made in a more detailed manner as to the reliability of the first measured distance and that of the second measured distance.

Namely, when TTL-AF is successful, a determination is made as to whether or not the focal length "f" is equal to or less than a predetermined focal length reference value Thf (S16). When the focal length "f" is determined to have been equal to or greater than the focal length reference value Thf, the reliability of the first measured distance Dt is determined to be high, and the focal length is adjusted in accordance with the first measured distance Dt (S24). As mentioned above, when the focal length "f" is greater than the focal length reference value Thf, the reliability of the first measured distance is determined to be high, for the following reasons.

When the focal length "f" is small, a depth field usually becomes greater. Put another way, when the focal length "f" is small, a focus is likely to be achieved even when a measured distance is not accurate. A focused lens position and, by extension, the first measured distance Dt are computed in accordance with the result of a determination as to whether or not a focus is achieved by means of TTL-AF. Therefore, when the focal length "f" is small, in many cases the reliability of the first measured distance Dt acquired by utilization of TTL-AF is low. Conversely, when the focal length "f" is great, the depth field becomes smaller. Accordingly, when the focal length "f" is large, a focused lens position can be said to strictly reflect the distance to the subject. Consequently, when the focal length "f" is great, the degree of reliability of the first measured distance Dt computed from the focused lens position is considered to be high. Therefore, in the present embodiment, when the focal length "f" is greater than the predetermined focal length reference value Thf, focus adjustment operation is performed in accordance with the first measured distance.

Meanwhile, when the focal length "f" is equal to the focal length reference value Thf or less, a determination is made as to whether or not the second measured distance De is less than the first measured distance Dt (S18). When the second measured distance De is the first measured distance Dt or less, focus adjustment operation is performed in accordance with the second measured distance De (S22). Conversely, when the first measured distance Dt is equal to or greater than the second measured distance value De, focus adjustment operation is performed in accordance with the first measured value (S24). In short, in the present embodiment, focus adjustment operation is performed in accordance with a smaller measured value.

The reason why a smaller measured distance for focus adjustment operation is utilized is that the principal subject to be focused on is usually situated at the proximal position. In other words, a smaller measured value can be said to represent a distance from the principal subject, which would be situated at the most proximal position, to a lens. Specifically, when an attempt is made to capture an image of a person who is the principal subject against a night view serving as a background, the night view of high contrast is likely to be focused on by means of TTL-AF. Put another way, in many cases, the first measured distance corresponds to a distance from the lens to the night view. Therefore, the first measured distance Dt is likely to become greater than the first measured distance De that is the distance from the lens to the person. In such a case, when an attempt is made to perform focus adjustment operation in accordance with the first measured distance Dt, the principal subject becomes blurred, and a rearward focused state is achieved. In another situation, there may also arise a case where the principal subject is not a person, but another object located in front of the person. In such a situation, when focus adjustment operation is performed in accordance with the second measured distance De acquired from the eye-to-eye distance, the rear-focused state, where the principal subject is not focused on, is achieved as well. In order to prevent occurrence of such a rear-focused state, in the present embodiment a smaller measured distance is determined to be more reliably, and this smaller measured distance is utilized for focus adjustment operation.

As is evident from the above descriptions, in the present embodiment, the reliability of the first measured distance Dt computed by utilization of TTL-AF and the second measured distance De computed by utilization of the eye-to-eye distance are compared with each other. Focus adjustment operation is performed in accordance with the measured distance determined to be more reliable. Consequently, focus adjustment operation can be performed at all times by use of an appropriate measured distance.

A second embodiment of the present invention will now be described. The configuration of a digital camera serving as the second embodiment is essentially the same as that of the digital camera serving as the first embodiment, and therefore detailed explanations thereof are omitted. In the second embodiment, the flow of a estimation the degrees of reliability of two measured distances slightly differs from that performed in the first embodiment.

Figure 7:
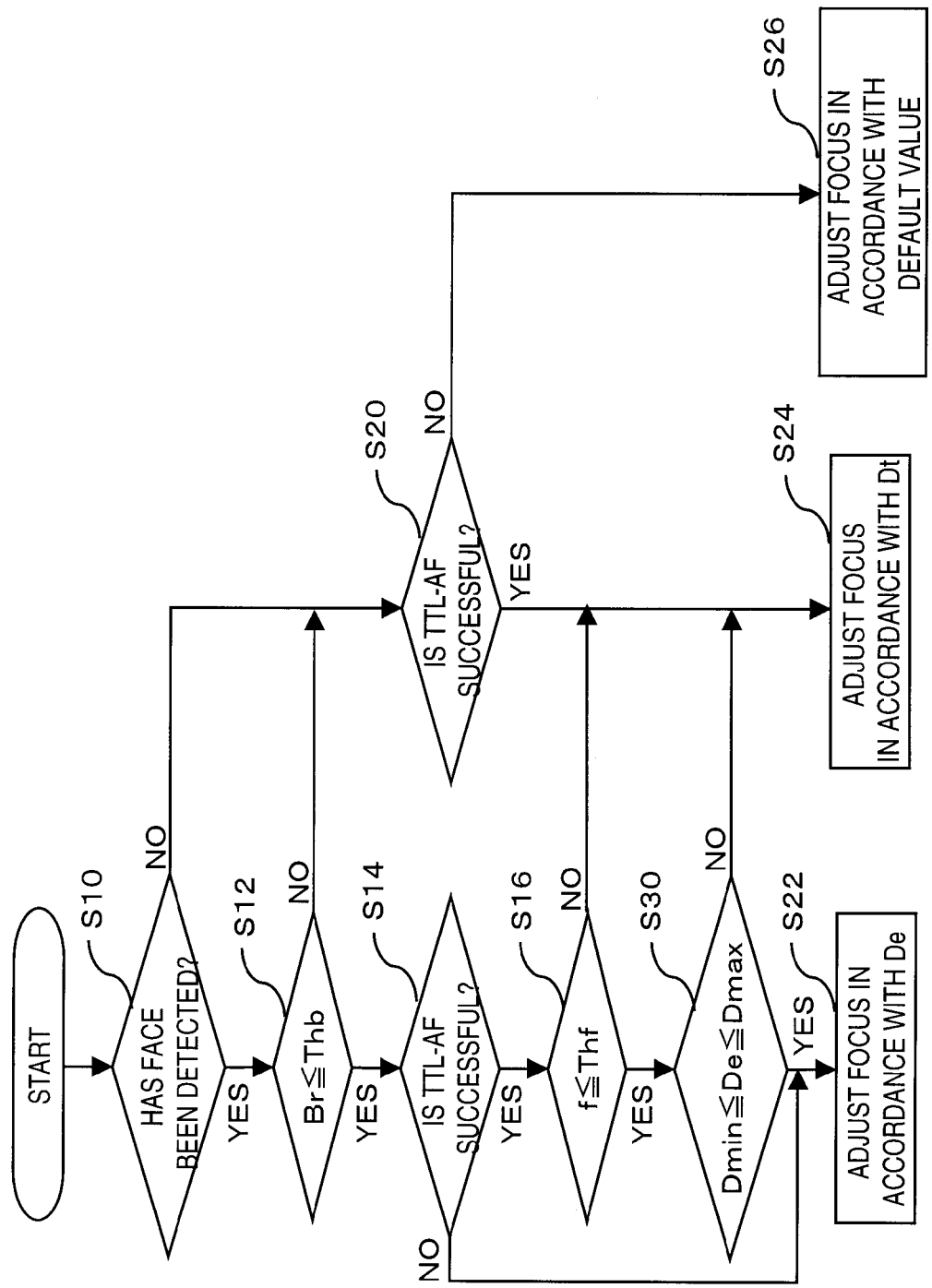
FIG. 7 is a flowchart showing the flow of a estimation the degrees of reliability of measured distances according to a second embodiment.

FIG. 7 is a flowchart of the second embodiment showing the flow of a estimation the degrees of reliability of measured distances. Even in the second embodiment, as in the case of the first embodiment, the reliability of two measured distances is determined from a result of detection/nondetection of a face area (S10), the ambient brightness (S12), and the focal length (S16). A difference between the first and second embodiments lies in that a determination is made as to whether or not the second measured distance De falls within a predetermined range (S30 in FIG. 7) in place of a comparison between the first measured distance Dt and the second measured distance De (S18 in FIG. 6). Specifically, in the first embodiment, when the focal length "f" is the focal length reference value Thp or less, the first measured distance Dt and the second measured distance De are compared with each other, and the smaller measured distance is utilized for focus adjustment operation.

In the present embodiment, however, when the focal length "f" is the focus length reference value Thp or less, a determination is made as to whether or not the second measured distance De falls within a predetermined reference range (from Dmin to Dmax) (S30). The predetermined reference range is a range where a distance can be measured from the distance between the eyes. Specifically, the range minimum value Dmin corresponds to the minimum length to a subject at which a distance can be measured from a distance between the eyes, and the range maximum value Dmax corresponds to the maximum length to a subject at which a distance can be measured from a distance between the eyes.

The range minimum value Dmin and the range maximum value Dmax are determined in accordance with the following standards. When a distance is measured from a distance between the eyes, a certain number of pixels are required to be present between the eyes of a person appearing in a preview image. The smaller the number of pixels that are present between the eyes of the person appearing in the preview image, the lower the resolving power of a distance, which in turn poses difficulty in maintenance of the accuracy of distance measurement. For these reasons, the number of pixels located between the eyes, which enables the resolving power of a distance to be maintained at a given level or more, is taken as Dc. The distance D to a subject computed by Equation 1 is set to the range minimum value Dmin. When the distance to the subject is excessively small, to thus fail to fit a pair of eyes of the person in the preview image, measurement of a distance from the distance between the eyes becomes impossible. The case where the pair of eyes of the person do not fit into the preview image corresponds to a case where the number of pixels located between the eyes has become greater than the number of pixels of the preview image in the lateral direction thereof. Consequently, the number of pixels of the preview image in the lateral direction thereof is taken as Dc, and the distance D to a subject computed by Equation 1 becomes a range maximum value Dmax.

When the second measured value De is less than the range minimum value Dmin or greater than the range maximum value Dmax, the possibility of the second measured distance De computed from the distance between the eyes being properly computed can be said to be low. Therefore, in this case, the reliability of the first measured distance Dt is considered to be high, and focus adjustment operation is performed in accordance with the first measured distance Dt (S24). Conversely, when the second measured value De falls within the range of the range minimum value Dmin to the range maximum value Dmax, the reliability of the second measured distance De is considered to be high, and focus adjustment operation is performed in accordance with the second measured value De (S22).

As has been described above, in the present embodiment, the degrees of reliability of the two measured distances are also compared with each other in consideration of the range where a distance can be measured from the distance between the eyes. Consequently, as in the case of the first embodiment, focus adjustment operation can be performed at all times in accordance with an appropriate measured value and, by extension, a suitable image can be captured.

Although the present embodiment omits a comparison between the first measured distance Dt and the second measured distance De, the distances may also be compared with each other. Namely, the first measured distance Dt is compared with the second measured distance De before or after step S30, and determination may be made as to which one of the measured distances is to be adopted.

Figure 8:
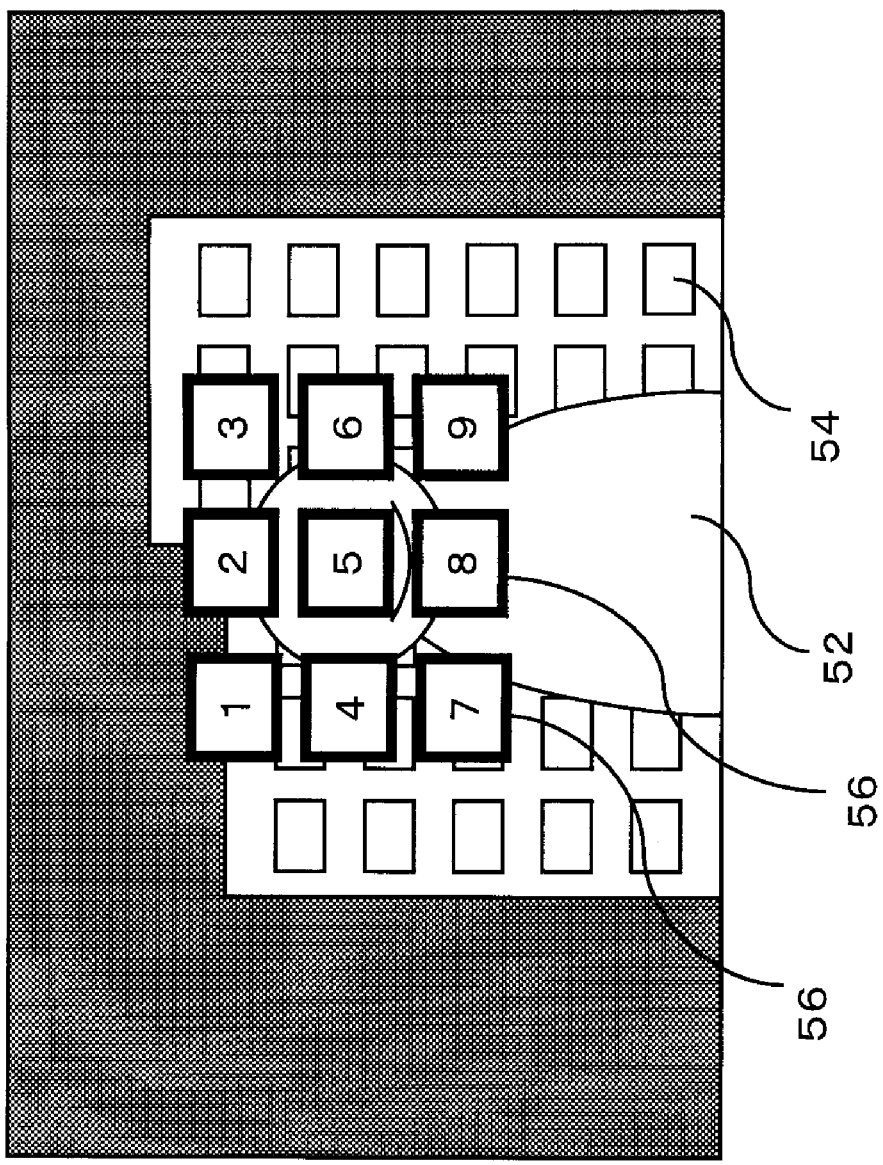
FIG. 8 is a view showing an example distance-measurement area of a third embodiment.
Figure 9:
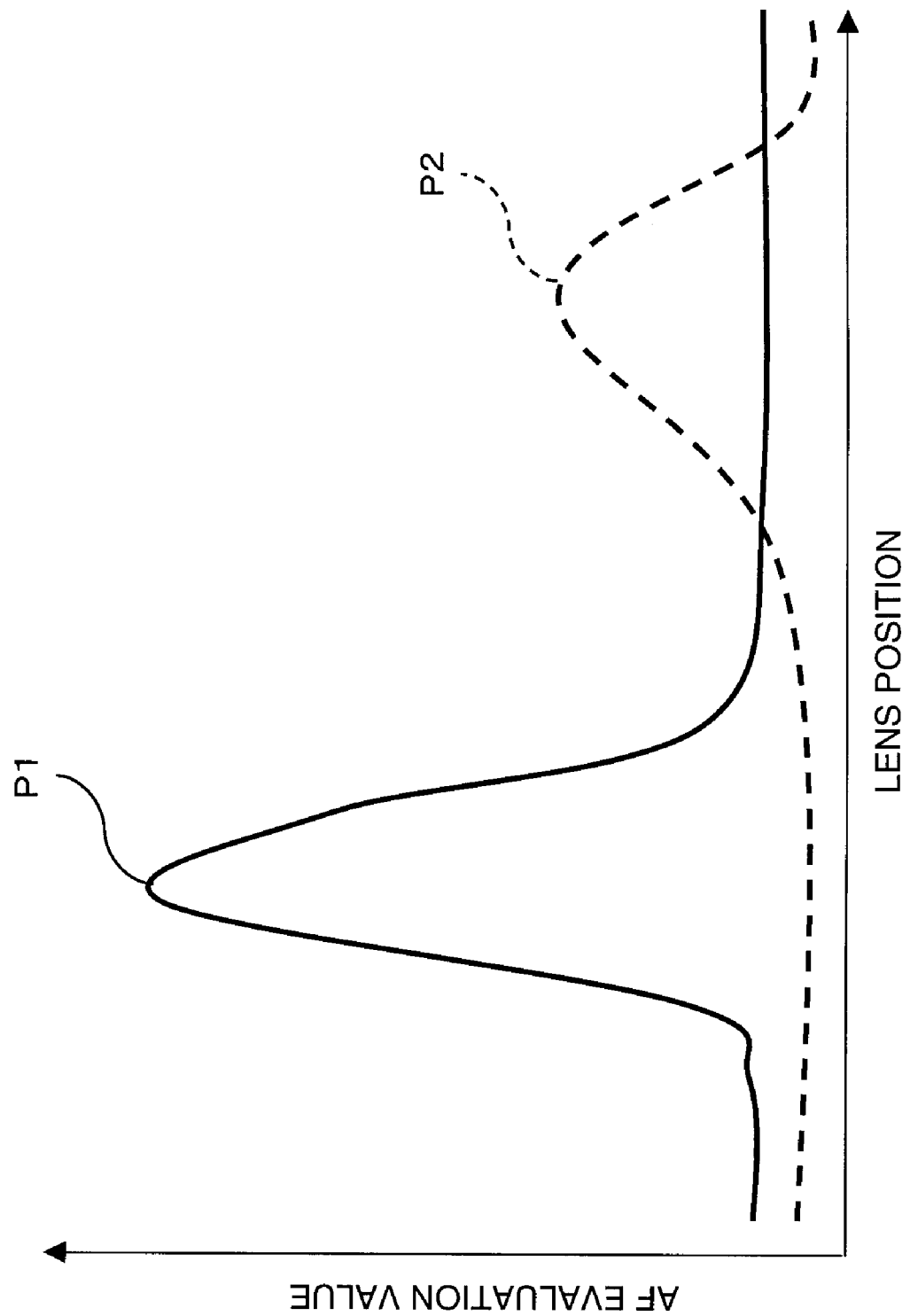
FIG. 9 is a view showing an example AF evaluation value of the third embodiment.

A third embodiment of the present invention will now be described. A digital camera of the third embodiment is also essentially identical in configuration with the digital camera of the first embodiment, and hence its detailed explanation is omitted. The third embodiment differs from the first embodiment in that measurement of distances to multipoints is performed by TTL-AF. Specifically, as shown in FIG. 3, the distance-measurement area 56 for TTL-AF is only one in the first embodiment. In the present embodiment, as shown in FIG. 8, a plurality of areas are set as distance-measurement areas 56, to thus realize AF operation. When the face area has been detected, the plurality of distance-measurement areas are set around the center of the face area. At this time, preferably, at least one of the plurality of distance-measurement areas is fully included in the face area, and, also preferably, a portion or the entirety of at least one of the distance-measurement areas is out of the face area. When the face area has not been detected, the distance-measurement areas 56 are set in the vicinity of the center of the preview image or the area specified by the user. The TTL-AF control section 38 computes an AF evaluation value in each of the distance-measurement areas 56. FIG. 9 is a view showing an example AF evaluation value acquired by a multipoint distance-measurement method. Although FIG. 9 illustrates only AF evaluation values in two distance-measurement areas, the AF evaluation value is originally present in equal numbers to the distance-measurement areas. The TTL-AF control section 38 specifies the focused lens position by utilization of a plurality of AF evaluation values. In the present embodiment, the TTL-AF control section 38 further determines whether the subject is two-dimensional or three-dimensional, by utilization of the plurality of AF evaluation values.

Figure 10:
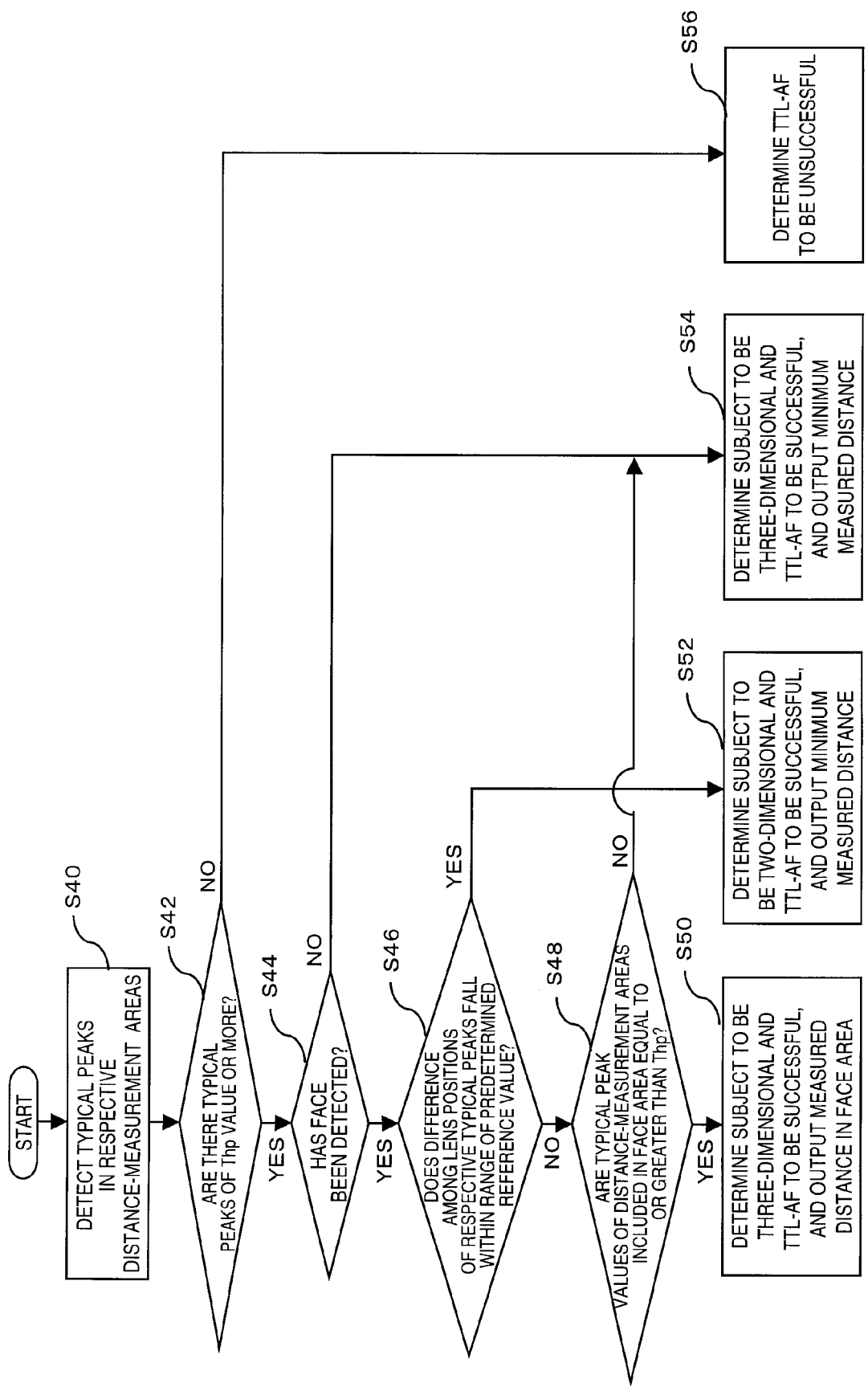
FIG. 10 is a flowchart showing the flow of TTL-AF of the third embodiment.

FIG. 10 is a flowchart showing the flow of computation of the first measured distance Dt utilizing TTL-AF based on multipoint distance measurement. As mentioned previously, according to multipoint distance measurement, the plurality of distance-measurement areas 56 are set, and an AF evaluation value is computed for each of the distance-measurement areas 56.

When the AF evaluation value is computed, a typical peak of the AF evaluation value is detected in each of the distance-measurement areas 56 (S40). In a conceivable case, a plurality of peaks may appear in one distance-measurement area 56. In this case, of the plurality of peaks, a peak having the highest peak position or a peak having the highest lens position (the minimum distance to the subject) is detected as a typical peak.

Next, a determination is made as to whether or not the typical peaks equal in number to the detected distance-measurement areas include typical peak having a peak value of AF reference value Thp or more (S42). When the determination shows that a typical peak having a peak value of Thp or more is not present, TTL-AF is determined to have failed, and processing is completed (S56).

Meanwhile, when there is a typical peak having a peak value of Thp or more, a determination is continually made as to whether or not the face area has been detected (S44). When the face has not been detected, a lens position of the typical peak value having a peak value of Thp or more is specified as a focused lens position, and the first measured distance is computed from the focused lens position (S54). When a typical peak having a peak value of Thp or more is present in numbers, a lens position—where a distance to the subject becomes shortest—among the plurality of typical peaks is specified as a focused lens position. For instance, in the embodiment shown in FIG. 9, when the peak value assumes the AF reference value Thp or more in any of the peaks P1 and P2, the lens position of the peak P2 where a greater lens position is achieved (a distance to a subject over which focus is achieved is small) is specified as a focused lens position.

When the face area has already been detected, a determination is made as to whether or not the difference among the lens positions of the plurality of typical peaks falls within a predetermined range (S46). Specifically, for example, there is determined a difference between the lens position of a fifth distance-measurement area included in the face area and the lens positions of the other distance-measurement areas, and an average of the differences is determined. Variations in the lens positions; specifically, measured distances, are determined from the average value.

Determination of the variations in the measured distances is for making a determination as to whether the subject is two-dimensional or three-dimensional. In the present embodiment, the face area is detected by means of the face detection section 42. Detection of a face is performed in accordance with pattern recognition, such as image recognition. Therefore, even when the subject is a poster having a human figure, or the like, a face area is detected. Meanwhile, in the present embodiment, AF, which utilizes an eye-to-eye distance, and TTL-AF are used in combination, as in the case of the first and second embodiments. However, when the human face is two-dimensional; namely, a human figure printed on a poster or the like, the degree of reliability of the second measured distance De computed from an eye-to-eye distance becomes considerably low. In the present embodiment, during performance of TTL-AF, a determination is made as to whether or not the subject is two-dimensional, so as to prevent use of the second measured distance De having a low degree of reliability.

Namely, when no essential difference exists among the lens positions of the typical peaks detected for the respective distance-measurement areas, the subject can be determined to be a plane which is free of irregularities. In this case, the subject is determined to be two-dimensional, and TTL-AF is determined to be successful. The lens position of a typical peak, among the plurality of typical peaks, whose peak value is equal to or greater than an AF reference value Thp and at which the lens position becomes maximum (i.e., a distance to a subject becomes smaller) is specified as a focused lens position. The first measured distance is computed from this specified focused lens position (S52).

Meanwhile, when a difference among the lens positions of the typical peaks detected from the respective distance-measurement areas is greater than or equal to a predetermined range, the subject can be determined to be a three-dimensional substance having irregularities. In this case, a determination is subsequently made as to whether or not a peak value of the typical peaks of the distance-measurement areas included in the face area is greater than the AF reference value Thp (S48). In the case of an illustrated example of FIG. 8, a determination is made as to whether or not the peak value of the typical peak of the fifth distance-measurement area set in the center of the human face is equal to or greater than the AF reference value Thp.

When the peak value of the typical peak of the distance-measurement area included in the face area is the AF reference value Thp or more, the lens position of the typical peak is specified as a focused lens position. The first measured distance Dt is computed from the focused lens position. At this time, the subject is determined to the three-dimensional, and TTL-AF is determined to be successful (S50).

When the peak value of the typical peak of the distance-measurement area included in the face area is less than the AF reference value Thp, the typical peak whose peak value is equal to or greater than the AF reference value Thp, of the other typical peaks, is specified. A lens position of the peak, among the specified typical peaks, where the value of the lens position becomes maximum is specified as a focused lens position. The first measured distance Dt is computed from the specified focused lens position. At this time, the subject is determined to be three-dimensional, and TTL-AF is determined to be successful (S52).

When TTL-AF involving multipoint distance measurement is completed, a result of measurement; namely, a result of determination as to whether TTL-AF is successful or unsuccessful, a result of determination as to whether or not the subject is two-dimensional, and the first measured distance Dt are output to the reliability estimation section 36.

Figure 11:
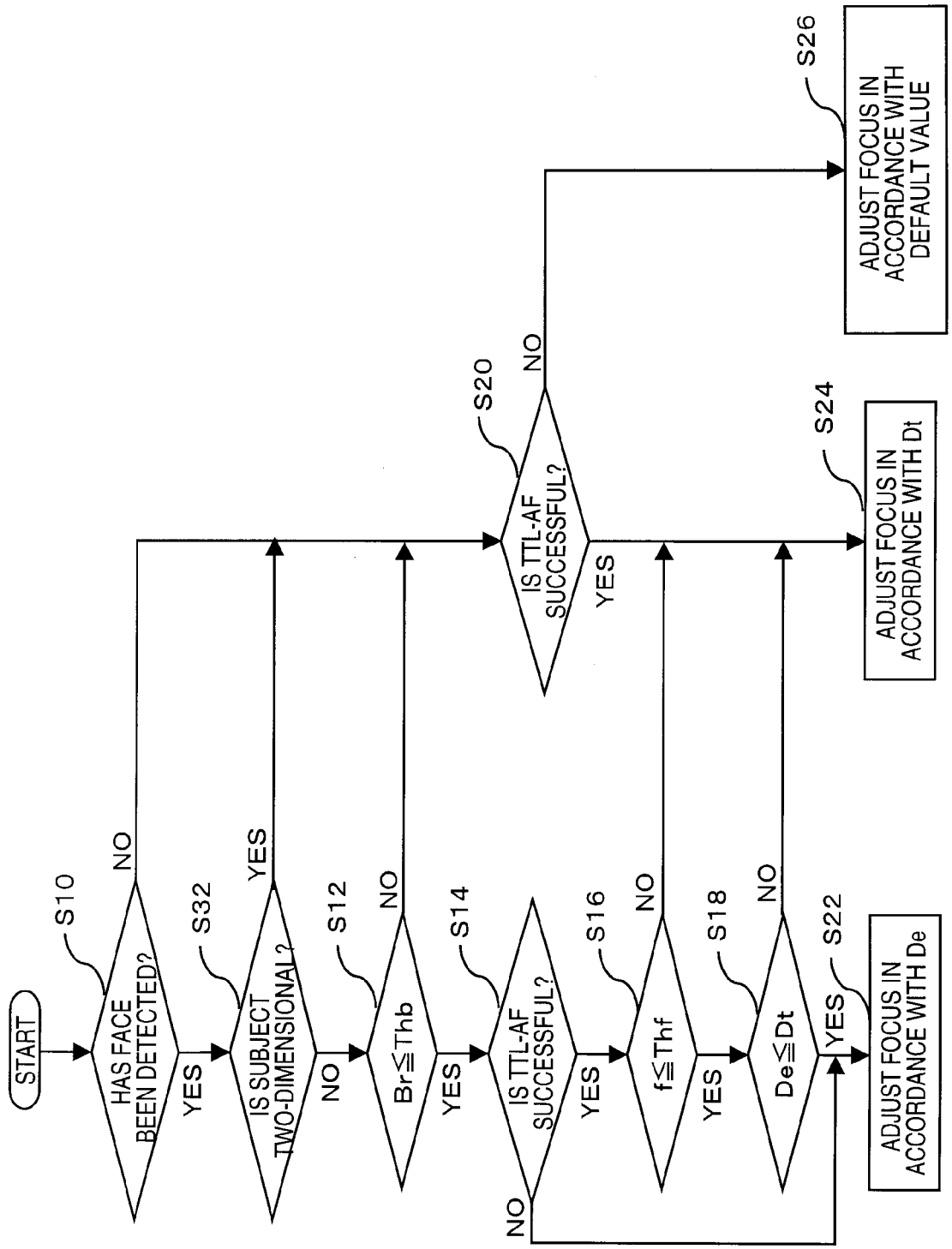
FIG. 11 is a flowchart showing the flow of a estimation the degrees of reliability of measured distances in the third embodiment.

The reliability estimation section 36 estimates the degree of reliability of the first measured distance Dt with the degree of reliability of the second measured distance De, by reference to a result output from the TTL-AF section 34. FIG. 11 is a flowchart showing the flow of estimation the degrees of reliability in the third embodiment. First, as in the case of the first and second embodiments, a determination is made as to whether or not the face area has been detected even in the present embodiment (S10). When the face area has not been detected, processing proceeds to step S20. When TTL-AF is successful, focus adjustment operation is performed in accordance with the first measured distance Dt. When TTL-AF is unsuccessful, focus adjustment operation is performed in accordance with a default value (S24, S26).

Meanwhile, when the face area has been detected, a determination is subsequently made as to whether or not the subject is two-dimensional (S32). The determination is rendered on the basis of the result of multipoint distance measurement output from the TTL-AF section 34. When the subject is planar; namely, a human figure printed on a poster or the like, the degree of reliability of the second measured value De computed from the eye-to-eye distance is said to be considerably low. Consequently, when the subject is two-dimensional, processing proceeds to step S20 in order to perform focus adjustment operation in accordance with the first measured distance Dt acquired by utilization of TTL-AF or with a default value.

When the subject is three-dimensional, the reliability of the second measured distance De is considered to be a certain level, and hence processing proceeds to step S12. In step S12 or a subsequent step, the flow of processing becomes analogous to that described in connection with the first embodiment. Specifically, the reliability estimation section 36 estimates the degree of reliability of the first measured distance Dt with the degree of reliability of the second measured distance De on the basis of the ambient brightness value Br, the focal length "f," and the result of a comparison between the first measured distance Dt and the second measured distance De. Focus adjustment operation is performed on the basis of the measured distance determined to be more reliable (S12 to S18).

As mentioned previously, according to the present embodiment, a determination is made as to whether the subject is three-dimensional or two-dimensional, in accordance with the difference among the lens positions of the plurality of typical peaks. A more-accurate reliability estimation can be performed by utilization of information about whether or not the subject is three-dimensional for a estimation the degrees of reliability of the measured distances. Consequently, the accuracy of focus adjustment operation can be enhanced to a greater extent.

Figure 12:
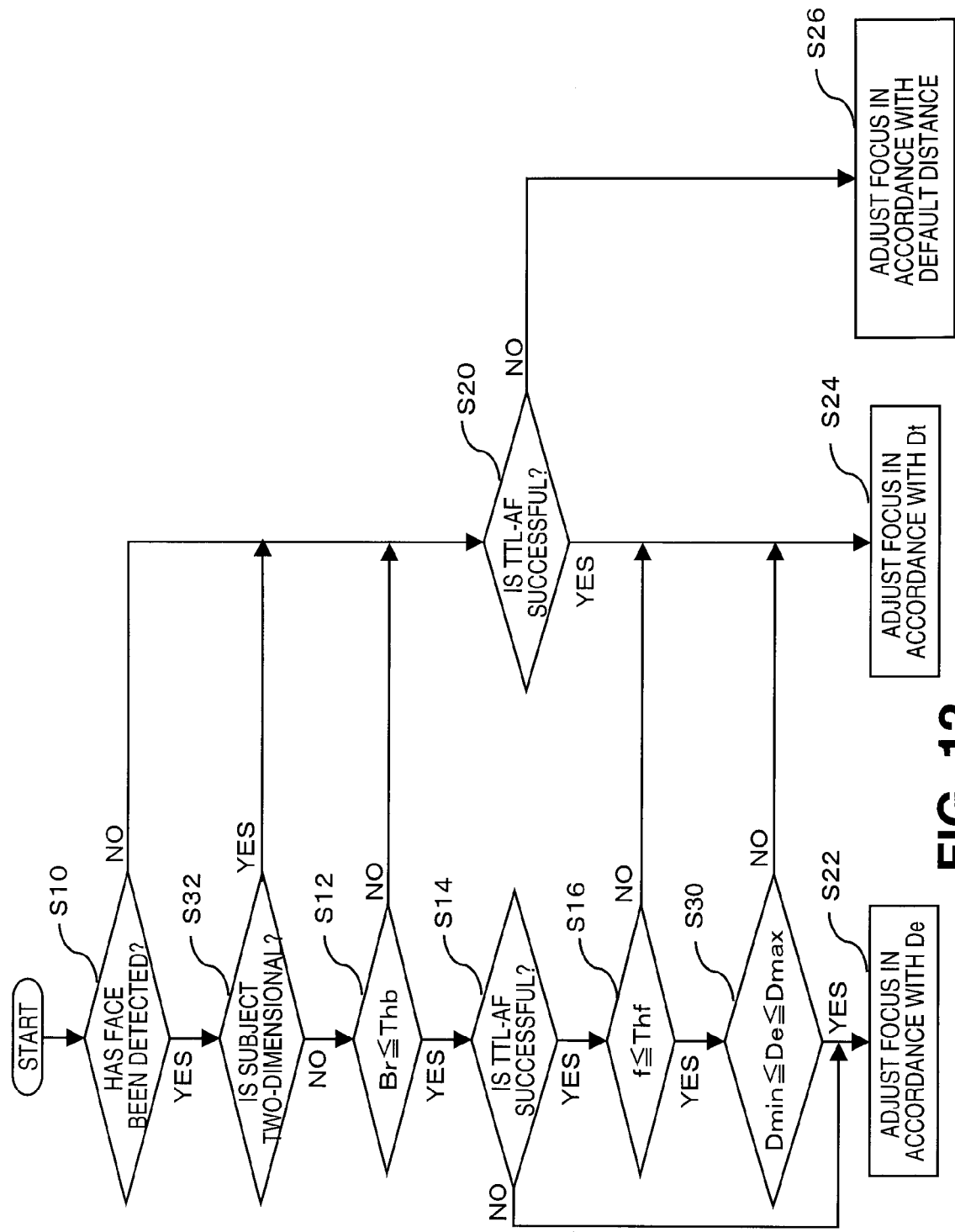
FIG. 12 is a flowchart showing the flow of an estimation of the degrees of reliability of measured distances in another embodiment.

In the present embodiment, as in the case of the first embodiment, after the focal length "f" has been determined to be the predetermined reference value Thf or greater, the first measured distance Dt is compared with the second measured distance De. However, as in the case of the second embodiment, a determination may also be made as to whether or not the second measured distance De falls within a predetermined range, in place of a comparison between the first measured distance Dt with the second measured distance De. As shown in FIG. 12, when the focal length "f" is determined to be the predetermined reference value Thf or less, a determination is subsequently made as to whether or not the second measured value De is greater than the range minimum value Dmin and smaller than the range maximum value Dmax (S30). Moreover, there may be performed both a comparison between the first measured distance Dt with the second measured distance De and rendering of a determination as to whether or not the second measured distance De falls within a predetermined range.

In any event, according to the present embodiment, the degree of reliability of the first measured value Dt is estimated with the degree of reliability of the second measured value De. Focus adjustment operation is performed in accordance with the measured distance determined to be more reliable. Accordingly, the reliability of focus adjustment operation can be enhanced to a greater extent.

In order to compute the second measured distance, characteristic points in a face other than the eyes may also be utilized. For instance, the second measured distance rather than the distance between the eyes may also be computed from a distance between the vertex of the nose and the point of center of the mouth. When a plurality of faces are detected by means of face detection, it is better to select, as a principal subject, a face whose face area becomes maximum or a face for which a measured distance computed from a distance between the eyes in each of the faces becomes minimum.

PARTS LIST 10 digital camera
12 group of lenses
14 aperture
16 CCD
18 A/D converter circuit
20 image processing section
22 external memory
24 LCD
26 motor
28 motor drive circuit 30 AF operation section
32 eye-to-eye distance AF section
34 TTL-AF section
36 reliability estimation section
38 TTL-AF control section
40 distance computing section
42 face detection section
44 eye-to-eye distance computing section
46 second distance measurement computing section
52 person
54 night view
56 distance measurement area
P1 high peak
P2 low peak

What is claimed is:

1. An imaging apparatus which performs focus adjustment operation by means of adjusting the position of a group of focus adjustment system lenses included in an imaging optical system, the apparatus comprising:
    an imaging unit for subjecting an image of a subject condensed by the imaging optical system to photoelectric conversion, to thus acquire a captured image;
    a first distance measurement unit for acquiring as a first measured distance a distance from the imaging optical system to the subject, in accordance with a result of detection of contrast of a predetermined distance measurement target area in the captured image;
    a face detection unit for detecting from the captured image coordinate positions, on the captured image, of at least the eyes of a person appearing in the captured image;
    an eye-to-eye distance computing unit for computing a distance between the eyes in a captured image of at least one person appearing in the captured image, in accordance with the detected coordinate positions of the eyes;
    a second distance measurement unit for computing a distance from an image-capturing optical system to a subject from the computed distance between the eyes and acquiring the distance as a second measured distance;
    a reliability estimation unit for estimating a degree of reliability of the first measured distance with a degree of reliability of the second measured distance; and
    a focus adjustment unit for performing focus adjustment operation in accordance with a measured distance determined to be highly reliable by the reliability estimation unit.

2. The imaging apparatus according to claim 1, wherein the reliability estimation unit determines the reliability of the first measured distance and that of the second measured distance in accordance with at least a result of comparison between the first measured distance and the second measured distance.

3. The imaging apparatus according to claim 1, wherein the reliability estimation unit determines the reliability of the measured distances in accordance with at least a focal length.

4. The imaging apparatus according to claim 1, wherein the reliability estimation unit determines the reliability of the measured distances in accordance with at least a result of a determination as to whether or not the second measured distance falls within a measurable range of the second distance measurement unit.

5. The imaging apparatus according to claim 1, wherein the reliability estimation unit determines the reliability of both measured distances in accordance with at least ambient brightness.

6. The imaging apparatus according to claim 1, wherein the face detection unit further detects, as a face area, an area occupied by a face of a person appearing in the captured image; and
    the first distance measurement unit takes an area around the face area detected by the face detection unit as a distance measurement target area.

7. The imaging apparatus according to claim 1, wherein the first distance measurement unit divides an area in a predetermined range, including the face area extracted by the face detection unit, into a plurality of distance measurement target areas, and acquires measured distances of the respective distance measurement target areas as first measured distances;
    the reliability estimation unit determines a distance measured by the first distance measurement unit to be more reliable than a distance measured by the second distance measurement unit when a difference among the respective first measured values computed by the first measurement unit is equal to or lower than a predetermined value; and
    the focus adjustment unit selects any one from the plurality of first measured distances and performs focus adjustment operation in accordance with the thus-selected distance when the distance measured by the first distance measurement unit is determined to be highly reliable.

8. The imaging apparatus according to claim 7, wherein at least one of the plurality of distance measurement target areas is included in the face area of the subject.

9. The imaging apparatus according to claim 7, wherein the focus adjustment unit selects the shortest measured distance from the plurality of first measured distances.

10. The imaging apparatus according to claim 7, wherein the focus adjustment unit selects a measured distance acquired from a distance measurement target area having the highest contrast value among the plurality of first measured distances.

11. An imaging apparatus which performs focus adjustment operation by means of adjusting the position of a group of focus adjustment system lenses included in an imaging optical system, the apparatus comprising:
    an imaging unit for subjecting an image of a subject condensed by the imaging optical system to photoelectric conversion, to thus acquire a captured image;
    a first distance measurement unit for acquiring as a first measured distance a distance from the imaging optical system to the subject, in accordance with a result of detection of contrast of a predetermined distance measurement target area in the captured image;
    a face detection unit for detecting, from the captured image, at least a characteristic of a person appearing in the captured image;
    a second distance measurement unit for computing a distance from an image-capturing optical system to a subject from characteristics of the detected face and acquiring the distance as a second measured distance;
    a reliability estimation unit for estimating a degree of reliability of the first measured distance with a degree of reliability of the second measured distance; and
    a focus adjustment unit for performing focus adjustment operation in accordance with a measured distance determined to be highly reliable by the reliability estimation unit.

* * * * *